March 13, 1956     G. T. McRAE     2,737,919
HATCH AND SLIDING COVER CONSTRUCTION Filed June 21, 1950     10 Sheets-Sheet 1

INVENTOR
*G. T. McRae.*
BY
*Albert H. Kirchner* ATTORNEY

March 13, 1956  G. T. McRAE  2,737,919
HATCH AND SLIDING COVER CONSTRUCTION
Filed June 21, 1950  10 Sheets-Sheet 2

INVENTOR
G. T. McRae
BY Albert H. Kirchner
ATTORNEY

March 13, 1956

G. T. McRAE 2,737,919

HATCH AND SLIDING COVER CONSTRUCTION

Filed June 21, 1950

INVENTOR
G. T. McRae.
BY Albert H. Kirchner
ATTORNEY

March 13, 1956 G. T. McRAE 2,737,919
HATCH AND SLIDING COVER CONSTRUCTION
Filed June 21, 1950 10 Sheets-Sheet 4

INVENTOR
G. T. McRae.
BY Albert H. Kirchner
ATTORNEY

March 13, 1956 G. T. McRAE 2,737,919
HATCH AND SLIDING COVER CONSTRUCTION
Filed June 21, 1950 10 Sheets-Sheet 10

INVENTOR
G. T. McRae.
BY Albert H. Kirchner
ATTORNEY

United States Patent Office 2,737,919
Patented Mar. 13, 1956

2,737,919
HATCH AND SLIDING COVER CONSTRUCTION

George T. McRae, Spring Hill, Ala., assignor to Waterman Steamship Corporation, Mobile, Ala., a corporation of Alabama Application June 21, 1950, Serial No. 169,371

27 Claims. (Cl. 114—202)

The present invention relates to covers for the hatches of cargo ships and to any and all analogous structures designed to provide an exceedingly strong removable closure for an opening disposed in a horizontal plane.

A principal specific object of the invention is to produce a new and improved solution of the old problem of providing a cargo ship weather deck hatch with a cover structure that will be strong enough to support any usual or unusually heavy deck cargo load and yet will be so easily manipulated as to be readily opened with a minimum of labor and skill.

Ancillary and related objects are to provide such a structure in a form that is capable of being easily and economically fabricated and assembled from parts that are largely standard structural shapes, that will be extremely rugged and will successfully withstand all reasonable use and even unreasonable abuse, that will be highly versatile in affording an open area over any part of the hatch or even over several separated parts thereof, that will be effective in opening a maximum area without requiring bodily removal of the cover members from the hatch, and that will in general be superior in numerous important respects to the best prior art of which I am aware.

Other objects are to provide hatch cover closing and opening mechanisms that are operable in exceedingly short periods of time, thus effecting important economies in cargo ship operation; to provide novel hatch covering means that will require a minimum of alteration in existing conventional hatchway construction; to cooperate with the usual tarpaulins so as to accomplish and maintain complete watertight integrity; to permit ready and easy bodily removal of all or any portion of the hatch covering members whenever required by extraordinary circumstances, such as the necessity of loading or unloading unusually large or bulky objects; and which will in respect of capacity to be easily lifted clear of the hatchway be comparable to standard pontoon hatch covers while possessing numerous advantages over such covers.

A further object is to provide an operating mechanism appropriate for weather deck use and adaptable also for use on lower deck hatches by a simple relocation of certain of the parts, embodying the same principles as will be explained hereinafter in terms of their application to a weather deck hatch. Such relocation, required for lower deck hatches which differ from weather deck hatches principally by lacking the bulb angles of the latter and by having lower coaming walls, involves only the exercise of common mechanical skill and no departure from the invention.

Generally speaking, the foregoing and other objects are accomplished and these and other advantages are attained by forming the hatch cover as a plurality of sections and supporting each section for swinging movement between (1) a horizontal closed position in which all are disposed edge to edge in the same plane so as to cooperate in filling the hatch opening and (2) a vertical open position in which each section may be propelled along the coaming by rotation of rollers that support it so that all of them, or any lesser number, may be stacked close together at either end of the hatch or elsewhere therein, so as to uncover all or any desired part of the hatch opening.

Much of the invention in its more specific aspects is concerned with the details of mechanism for latching the sections opened or closed, for propelling them with facility and certainty, and for assuring unfailing operation under all conditions, but these details, or at least some of them, can be varied and not all of them need be used conjointly in practicing the invention. They will all be described and explained in the embodiments of the invention which have been selected in this patent application to illustrate the best and hence presently preferred forms in which I contemplate practicing the invention, but these details are essential only to the extent to which they are within the scope and purview of the appended claims construed in the light of the prior art.

Figures 3, 4:
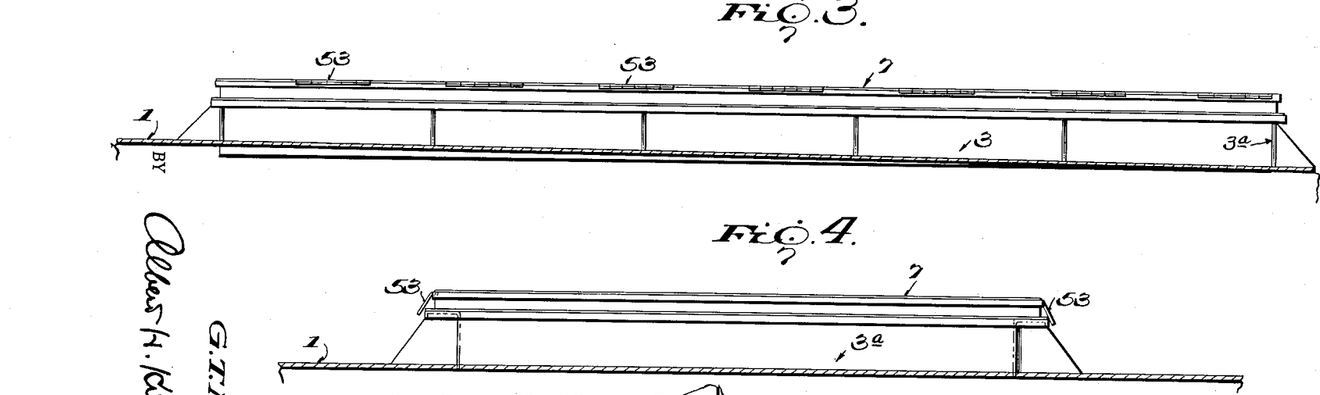
Fig. 3 is a side elevation of the hatch with the sections closed.
Fig. 4 is an end elevation of the hatch with the sections closed.
Figure 5:
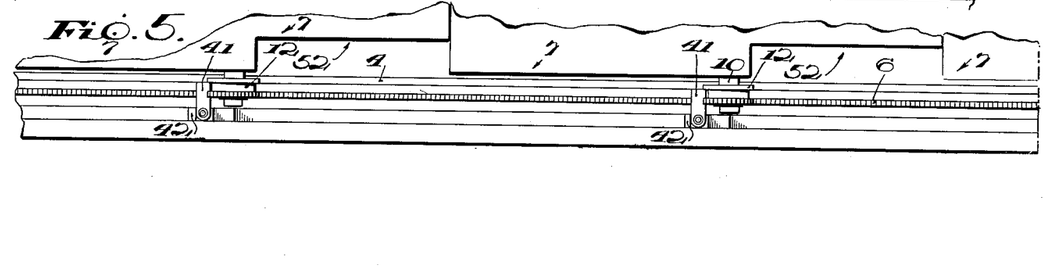
Fig. 5 is a fragmentary plan view showing a portion of the top of one of the coaming ledges.
Figures 6, 7, 8, 9:
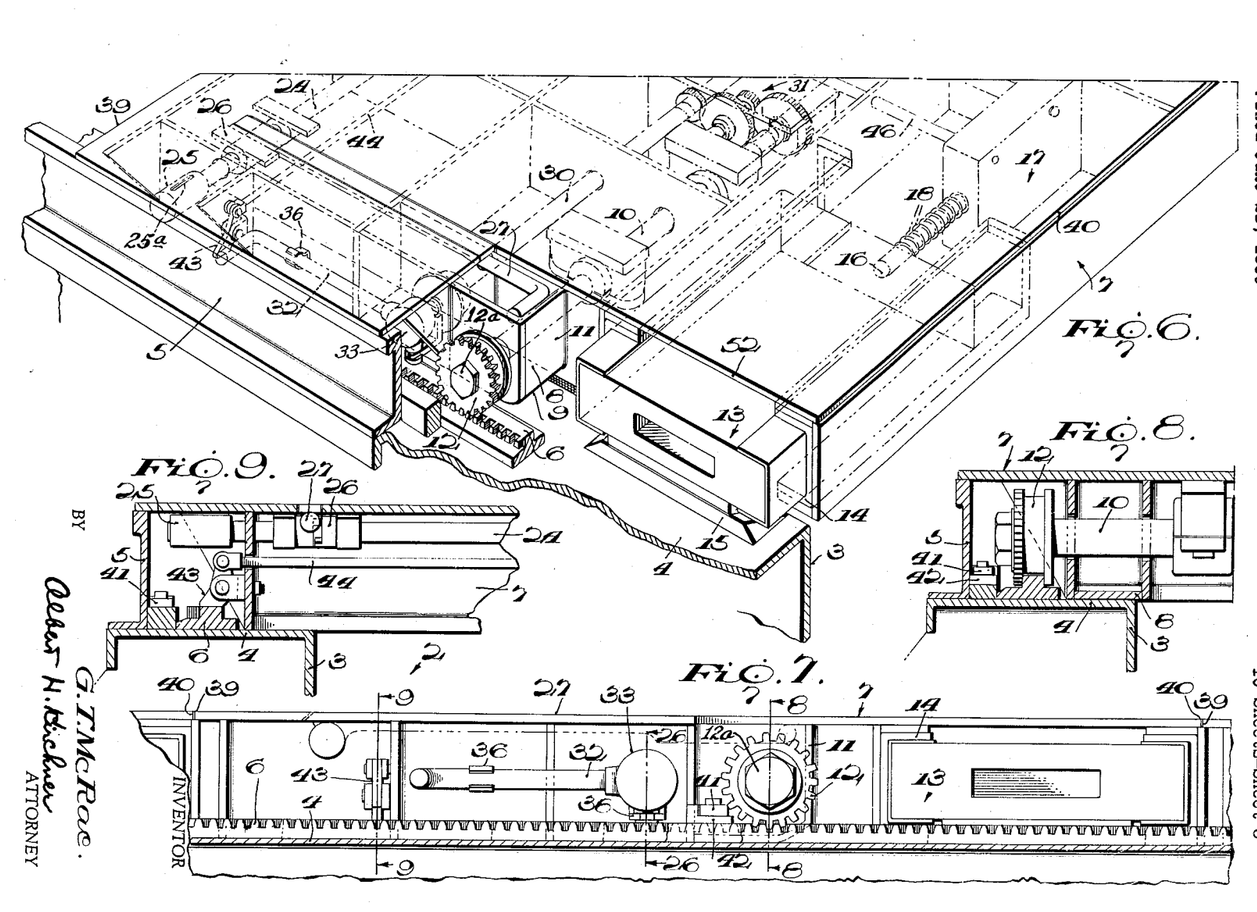
Fig. 6 is a perspective view with a portion of one of the coaming sides and certain adjacent parts broken away.
Fig. 7 is an end elevation of one of the sections shown in closed position.
Fig. 8 is a detail vertical section on the line 8—8 of Fig. 7.
Fig. 9 is a detail vertical section on the line 9—9 of Fig. 7.
Figure 10:
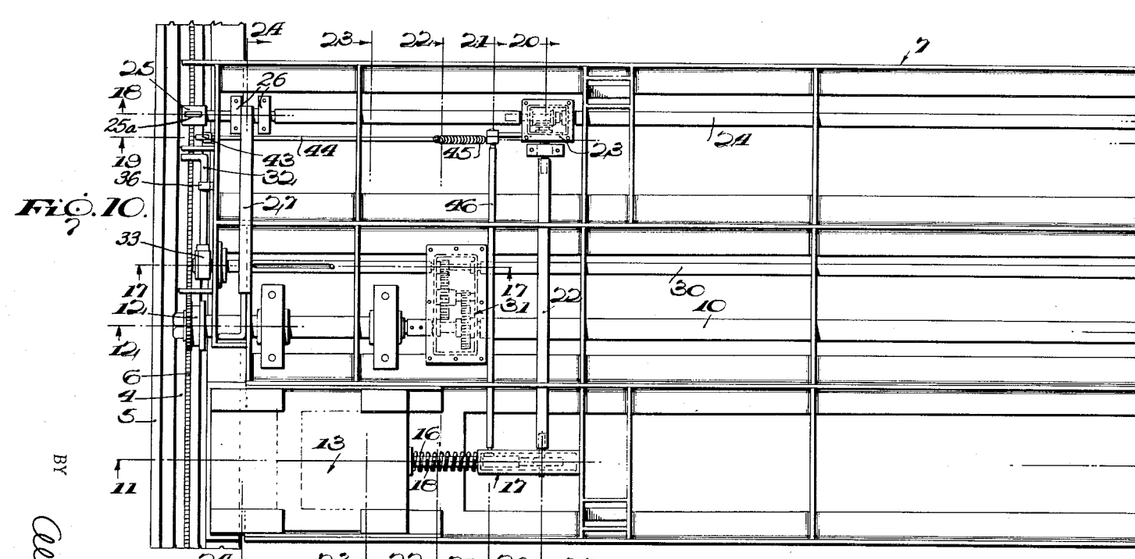
Fig. 10 is a partial top plan view of a cover section with its top plate removed.

In these drawings, which show the invention embodied in a weather deck hatch cover, the reference numeral 1 designates the weather deck of a ship having a cargo hold provided with a rectangular hatchway or hatch opening 2. In the illustrated embodiment, as in most standard large scale constructions, the hatch opening is defined at two opposite sides by longitudinal girders 3 each forming a coaming wall having a coaming ledge 4 surmounted by a bulb angle or coaming side 5 and defined at its ends by transverse girders 3a as shown in Fig. 4. Along each of two opposite sides (preferably the longer sides if the hatchway is oblong, which longer sides are herein designated sides as distinguished from the hatchway ends) there is securely anchored to the coaming ledge, as by welding when the ledges are made of metal, as is preferred, a track 6, which is conveniently provided in the form of segments or sections set end to end and extending continuously along the length of each side. These tracks are spaced outwardly from the hatch opening as defined by the longitudinal girders 3, leaving a clear ledge area inboard of each track. The two tracks are identical, each being configured on one of its sides, e. g., on its outboard side, as shown in Fig. 6, with a plurality of teeth with upwardly open spaces between them, thus forming an upwardly facing rack.

Figure 1:
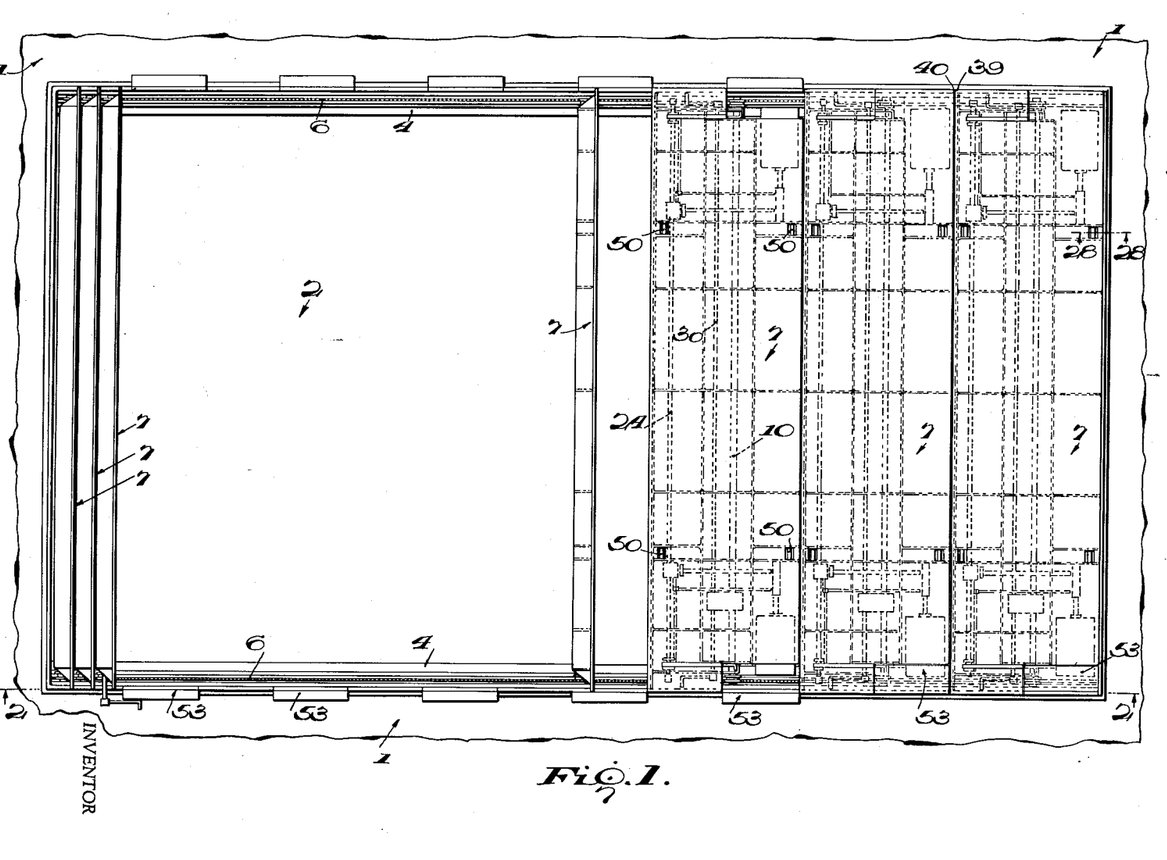
Figure 1 is a top plan view of a hatchway provided with seven sections; three of the sections are shown in closed position and four in open position.

The hatch cover is made up of a plurality (seven in the illustrated embodiment of the invention) of separate, independent and identical sections 7 which cooperate and combine when appropriately related to close the hatchway and which can be individually operated to open position so as to uncover more or less of the hatchway. Fig. 1 shows in plan three of the sections in closed position covering approximately three-sevenths of the hatchway area, three other sections in open position and removed to one end of the hatchway thus opening nearly three-sevenths of the area, and one section in open position but not removed from the location in which it can be closed to cooperate with the three closed sections to increase the closed area to four-sevenths of the total hatchway area. The parts are shown in the same positions in the side elevational view of Fig. 2. The manner in which each section is constructed, supported on the coaming ledge, and operated between opening and closing positions and to and from removed locations will now be explained with particular reference to Figs. 6 to 28 inclusive which show the preferred species of section in some detail and on different scales most of which are larger than the scales of Figs. 1 to 5 inclusive.

Figure 2:
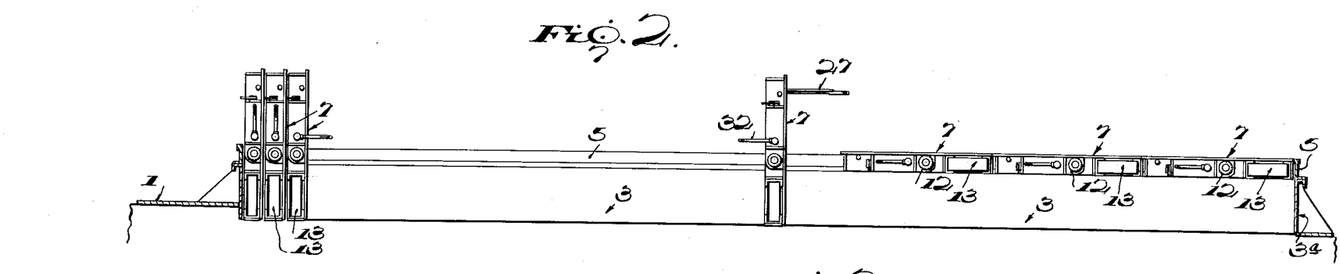
Fig. 2 is a longitudinal section taken through the deck on the line 2—2 of Fig. 1 with the near coaming side removed and with the hatch cover sections shown in end elevation.

Each of the cover sections 7 has two parallel sides forming its longer dimensions. One of these sides is longer than the other, and the two sides are connected by ends each of which is formed in two planes offset about midway between the two sides, so that the section has in plan a long half and a short half, or has the two corners at one side cut back to substantially the median lengthwise line of the section. The conformation at one end is well shown in Fig. 6; the opposite end is identical. The proportions are such that the short half of the section is slightly shorter than the width of the hatch opening 2 while the longer half is appreciably longer than such width. The indented side of the section will fit down between the two longitudinal girders 3, while the longer unindented side projects over ledge 4. It will be evident therefore that if the section be pivoted at about its median lengthwise line on the ledge, then it will be possible to swing the section between a horizontal position as shown at the right of Fig. 2 and a vertical position as shown at the center and left, in which vertical position the shorter half of the section has turned down into the hatchway and the longer half has swung above it. Moreover, when thus raised to vertical position the section can be moved along the coaming ledge if rollers or the equivalent be provided on or about the pivoting axis, thus clearing the hatchway as has been shown done at the left in Fig. 2. The structure by which this arrangement and mode of operation are accomplished will now be described, but first it seems appropriate to explain that the particular structural design of the section is unimportant, insofar as the broad principles of the invention are concerned, as long as it provides a member which is rigid and mechanically strong and affords adequate thickness space for mounting and housing the necessary mechanism and operating parts. One manner of accomplishing these purposes is to fabricate the section from angles, plates, channels, and other common structural steel shapes welded together to produce a generally pan-like assembly which may be closed at its bottom by plates of light sheet metal but which in the preferred embodiments of the invention is left open at its bottom or under surface and is closed at its top by the substantially smooth, continuous surface of the pan bottom which constitutes a well braced, strong hatch closure surface adapted to be covered by a waterproofing tarpaulin and serve as a support for deck cargo of the maximum weight which the hatch cover may at any time be called upon to bear. The specific elements of the preferred cover framework and surfacing are shown in the drawings but will not be described in this specification except to such extent as may be helpful to an understanding of the cover section over-all shape and the cover operating mechanism which constitute principal elements of a complete embodiment of the invention.

When the sections are disposed in horizontal position closing the hatchway, the longer half of each of them is supported on the coaming ledge by a part of the basic framework or section structure, such as a frame 8 which serves as a foot or abutment bearing directly on the coaming ledge 4. This part of the basic framework may constitute a box-like portion which may be made up of an assembly of plates, T-irons, angles and the like, as best shown in Figs. 6, 8, 13 and 24, all welded together as an integral part of the cover section well adapted to support the section and any imposed cargo load without undue bending or distortion. The inner end of this frame is curved up at its bottom to form a rounded nose 9 which will roll on the coaming ledge 4 as the section swings from horizontal to vertical position. A shaft 10 is journaled in the frame 8 with its axis nearer to the inner end wall 11 of the frame than to the bottom wall thereof, so that the periphery of a roller 12 which is splined on each end of the shaft is set back farther from the bottom wall than from the end wall, as is well shown in Fig. 7. This roller has two spaced flanges the outer of which is toothed and incompletely meshes with the teeth of the track 6, with the raised center of the track occupying the space between the two flanges and bearing the weight of the cover section, as shown in Figs. 7 and 8. The relation of the shaft axis and the frame bottom and inner end walls is such that when the section is horizontal the coaming ledge 4 will be a bearing for the frame with the roller well elevated above the track 6 but with the teeth of the roller and track still incompletely engaged and with the raised center of the track still caught between the two flanges of the roller, all as shown in Figs. 7 and 8, and when the section is vertical, or nearly vertical, the roller will have settled down onto the track with the center of the roller in bearing relationship to the raised portion of the track and it alone will be supporting the section, without any of the weight of the section being borne by the toothed flange and rack, the inner end wall 11 of the frame 8 being spaced up above the coaming ledge. In this way the section when in its closed, cargo-bearing position imposes no load on the roller or roller shaft, or on the bearings thereof which support only the weight of the section when the section is turned up to or toward vertical position. At such times, of course, the section is unloaded with any cargo or other weight.

The shaft 10 extends the full length of the section and the arrangement of frame and roller is identical at both ends. The shaft may be tubular in the interest of economy of weight, with the rollers mounted on spindles telescoped into the ends of the tube preferably with provision for a slight amount of axial play, thus permitting the rollers to conform to whatever inequality may exist in the spacing of the two tracks which are mounted on the coaming ledges jut outside the hatch opening at opposite sides of the hatch. The rollers may be securely mounted on the ends of the spindles, and hence on the shaft 10, by cap bolts 12a threaded into the spindles and pinned thereto to prevent unscrewing.

To assist in supporting the horizontally disposed section on the coaming and to prevent undesired rotation to open, vertical position, the shorter half of the section is provided at each end with a bolt 13 slidably mounted in a guideway 14 so that the bolt can be entirely retracted within the section or can be projected therefrom. When retracted, the shorter half is short enough to swing or be swung down between the longitudinal girders 3 which define the hatch opening 2; when the bolt is projected it increases the effective length of the shorter half of the section and, the section being in horizontal position, rests on a pad 15 fixed on the coaming ledge and thus assists in supporting the section on the coaming and keeps the section from swinging toward vertical position. I prefer to arrange the parts, including the mechanism inside the section, so that the shorter half of the section is slightly heavier than the longer half. Thus the section will swing automatically to vertical position when the bolt 13 is retracted and hence the section can be manually turned to horizontal position with little effort whenever desired. This slight overbalancing of the shorter half is easily effected, notwithstanding the greater length of the other half, because the bolts are quite heavy, as are their operating mechanism, and of course the shaft 10 is located with proper relation to the section's center of gravity to produce the desired unbalance.

Figures 11, 12:
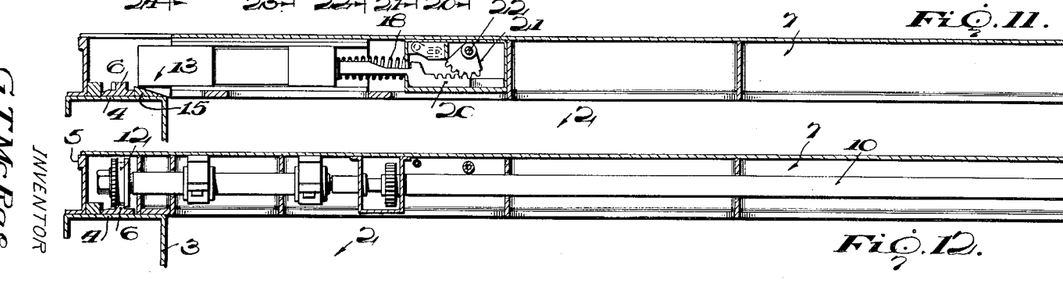
Fig. 11 is a vertical section on the line 11—11 of Fig. 10.
Fig. 12 is a vertical section on the line 12—12 of Fig. 10.

There are identical bolt and pad structures at the two ends of each section. The pads are located at spaced intervals along each side coaming ledge, one at each point where a bolt will be projected when the corresponding section is in position to perform its hatch-closing function. As shown in Figs. 6 and 11, the pads are best made with an inboard downslope, thus facilitating movement of the bolts during their inboard retraction.

The bolts are stout, heavy box-like members snugly fitting into their guideways for low friction sliding movement. To this end the ways may be made of stainless steel or other corrosion-resistant metal, and the bolts may be surfaced in bronze or with strips of some self-lubricating material such as the kind commercially known as "Oilite." The two bolts of each section may be coupled together for simultaneous sliding movement of both in projecting direction as well as in retracting direction by operating mechanism which will now be described.

Figures 13, 14, 15, 16, 17:
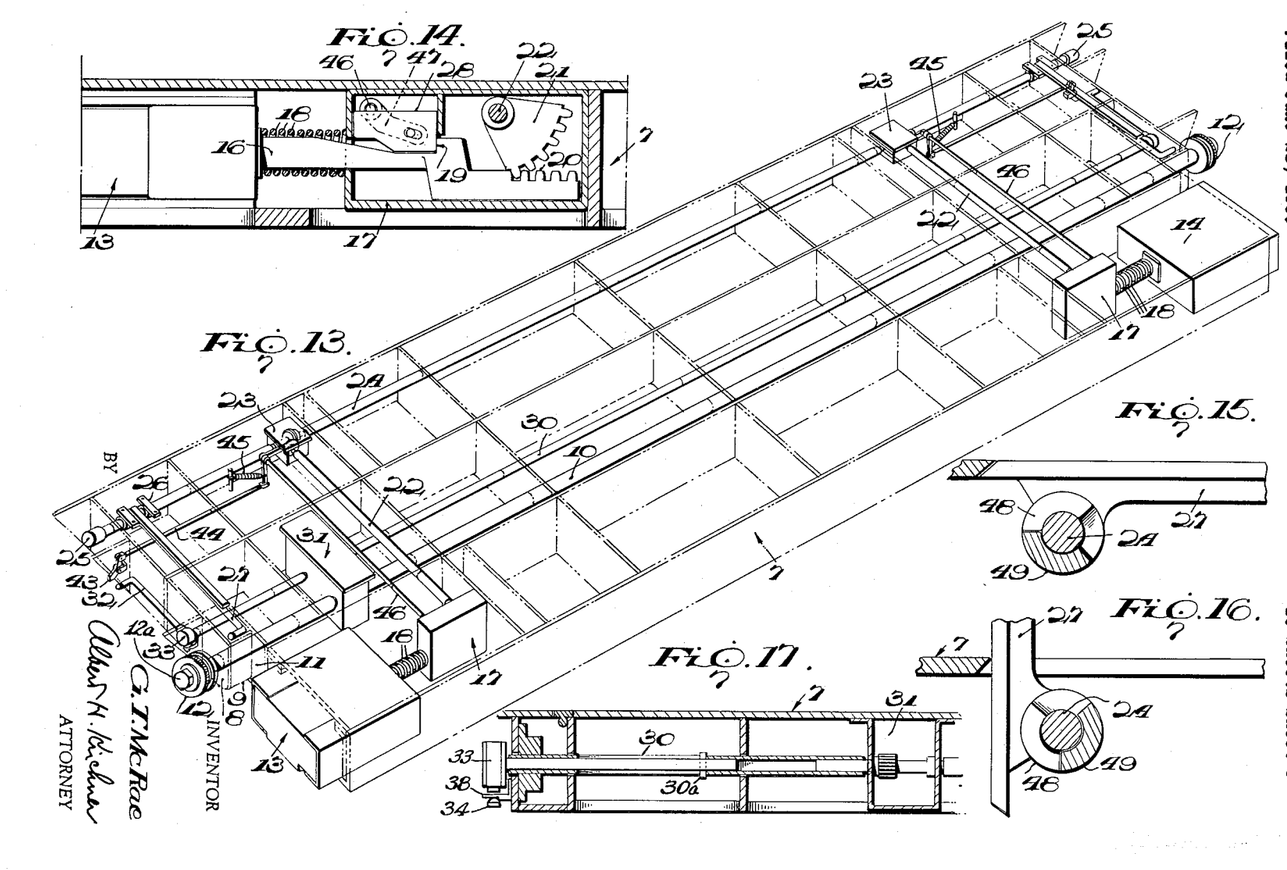
Fig. 13 is a perspective view of a cover section showing certain of the operating mechanism.
Fig. 14 is a larger scale detail of Fig. 11 with, however, the bolt latched in retracted position.
Fig. 15 is a section through a cover section top plate with the bolt retracting handle in closed position.
Fig. 16 is a similar view showing the bolt retracting handle in open position.
Figs. 17 through 24 are respectively sections on the correspondingly numbered section lines of Fig. 10.
Figure 18:
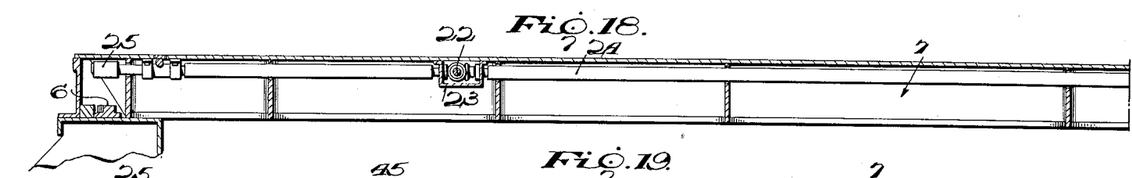
Figures 19, 20, 21, 22, 23:
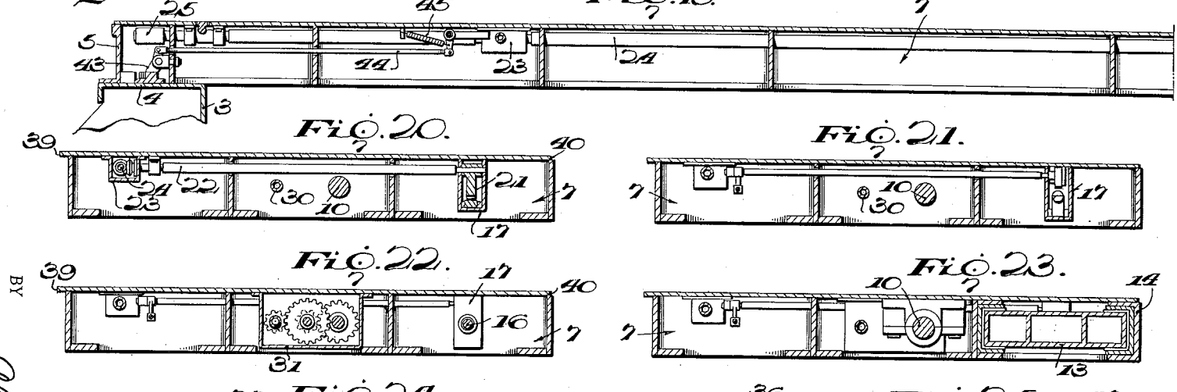

Inwardly projecting from the inner end of each bolt is a stem 16 (Figs. 6, 10 and 16) which extends into a box 17 fixed to a cross bracing member of the section and serving as an abutment for a coil spring 18 which exerts a compressive force against the bolt tending to project it. The box serves also as a housing for operating and latching mechanism for the bolt. As shown in Fig. 14, this includes an outwardly facing shoulder 19 formed on the stem 16 and a short rack tooth formation 20 on the extreme inner end of the stem. Meshed with the rack formation is a gear segment 21 fast on a cross shaft 22 journaled in the box and extending laterally through the section into another box 23 in which the shaft is connected by bevel gears to a shaft 24 which extends the entire length of the section (through two of the boxes 23, one for each of the bolts) to terminate on the outer end of the section in a radial enlargement 25 arranged to be engaged by an emergency turning tool (not shown) as by being provided with a radial slot 25a, as best shown in Fig. 6.

Figures 24, 25, 26, 27, 28:
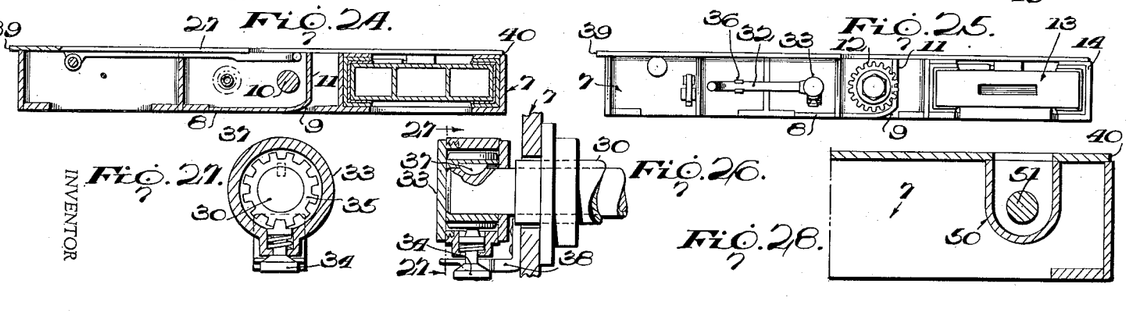
Fig. 25 is an end elevation of a cover section.
Fig. 26 is a vertical section on the line 26—26 of Fig. 7.
Fig. 27 is a section on the line 27—27 of Fig. 26.
Fig. 28 is a section on the line 28—28 of Fig. 1.
Figures 29, 30:
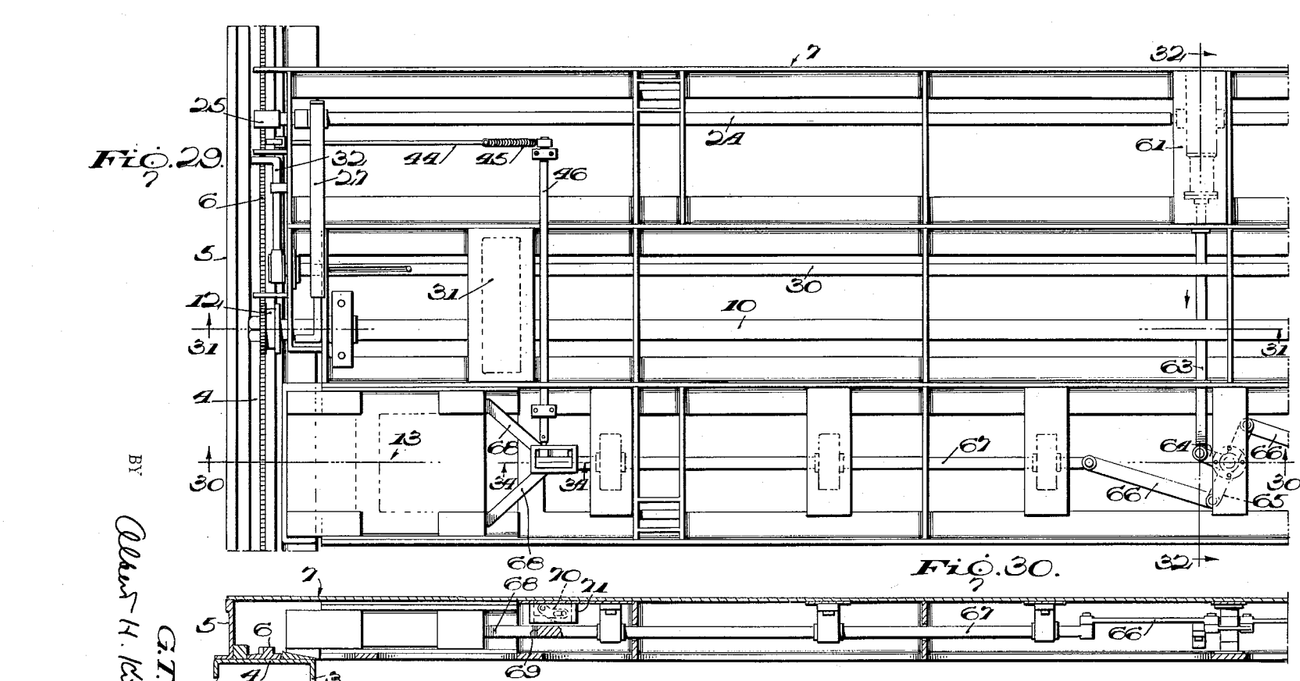
Fig. 29 is a partial top plan view like that of Fig. 10 but showing a modified form of hatch cover section.
Figs. 30 through 32 are respectively sections on the correspondingly numbered lines of Fig. 29.
Figure 31:
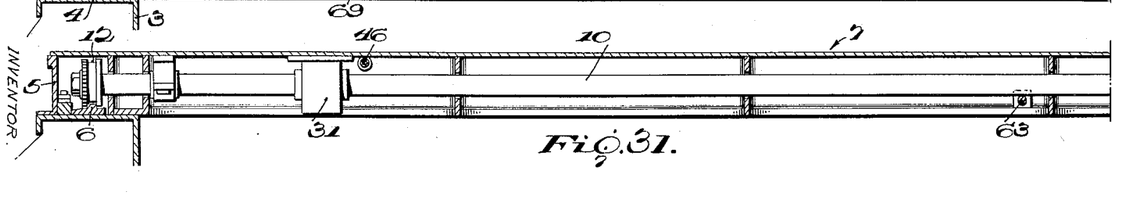

Just inwardly of the section from each outside enlargement 25 the shaft 24 is journaled in a pair of bearings 26 set closely together between which a handle 27 is coupled radially to the shaft. This handle, as best shown in Figs. 6, 7, 10 and 13, normally lies just under the plane of the section surface or cover plate and has welded to its top side a strip of surface plate metal which registers in and fills a slot in the section cover plate, with the end of the handle projecting a short distance beyond the long half of the section and into the cut-out at the end of the short half, as shown in Fig. 6, where it rests in the frame 8 and is supported by one of the structural plates or webs thereof, as shown in Figs. 6 and 24. It will be evident that when the projecting end of the handle is grasped and the handle is lifted so that the shaft 24 is rotated counterclockwise as viewed in Fig. 13, the shaft 22 will be rotated counterclockwise to pull the stem 16, compressing the spring 18 and retracting the bolt 13 substantially entirely into the section.

The bolt is held in retracted position by the action of a latch block 28 which drops behind the shoulder 19 of the stem 16 as shown in Fig. 14. With the shorter half of the section deprived of the support of the bolts on the coaming ledge, the shorter half, being heavier, will swing down into the hatchway, with the section turning about the curved nose 9 at the bottom of the frame 8 which alone is now supporting it on the coaming ledge. The relative weights of the two halves of the section are so adjusted that the shorter half will slightly overbalance the longer, thus making the swinging movement automatic on retraction of the bolts and bringing each unbolted section to the vertical position in which the center and three lefthand sections are shown in Fig. 2.

Because of the relationship of the axis of the roller 12 to the inner end wall 11 of frame 8 which has been explained hereinabove, the roller descends during the first few degrees of rotation of the section until the smooth bearing surface of the roller is in contact with the raised bearing portion of the track and thereafter the swinging of the section is about the roller axis with the smooth bearing surface of the roller and its shaft supporting the weight of the section. As shown in Fig. 7, with the cover section in horizontal position and with the roller slightly elevated above the track, the teeth of the roller flange are incompetely meshed with the teeth of the track, and as the cover section rotates to the vertical position the teeth of the flange sink somewhat lower into the teeth of the track, but with the cover section in the completely vertical position the teeth of the roller flange are still incompetely meshed with the teeth of the track and are not in supporting relationship therewith.

Assuming all sections that are to be opened have been swung to vertical position, any or all of them can be moved along the hatchway to a stowed position anywhere within the confines of the coaming, i.e., at either end of the hatch opening or in the middle or any other intermediate part. This is accomplished by propelling any selected section or group of sections by turning the shaft 10, thus driving its rollers 12 along the track. To effect this driving movement I prefer to provide the shaft with gearing producing a mechanical advantage so that the weight of the section will not prevent, or even render difficult or laborious, its being moved manually by a single workman, even though the pitch of the ship may require it to be moved upgrade. The gearing and driving means in one preferred form of embodiment will now be described.

A drive shaft 30 is journaled to extend lengthwise of the section in close parallelism to the roller shaft 10. Both shafts pass through a single gear box 31 in which the drive shaft is connected to the roller shaft by a train of reduction gearing, best shown in Fig. 10, so that a number of rotations of the drive shaft are required to produce a single rotation of the rollers. Each of the ends of the drive shaft projects through the adjacent end plate of the section and has clutch-connected to it an operating handle 32 which becomes exposed and accessible for use whenever the section swings up toward vertical position following retraction of the bolts 13. The handles are identical and only one need be described. It may consist of a stout short length of rod stock turned right-angularly at one end to provide a crank end and terminating at its other end in a generally circular housing 33 having a radial enlargement in which a clutch pin 34 is spring-pressed inwardly so as normally to fit in between two adjacent teeth of a stout pinion 35 splined on the end of the shaft 30 and enclosed within the housing 33, as shown in Figs. 26 and 27. It will be evident that cranking the handle will rotate the shafts 30 and 10 and the rollers 12 to propel the section along the track 6, which the reduction gearing makes an easy operation.

To stow the handle 32 when not in use I provide a spring clip 36 (Figs. 7 and 25) in the section end wall, and I make the handle movable axially of the shaft 30, as by forming the shaft in two telescoping sections connected by a pin 30a fixed in the inner section and sliding in diametrically opposite slots in the outer section, as shown in Fig. 17, so that it can be pushed into and pulled from the clip. This relationship of the handle to the shaft can be attained by the construction best shown in Fig. 26, which includes a key 37 splining the pinion 35 on the shaft and permitting movement of the pinion and the housing 33 axially on the shaft sufficient for the handle to clear the clip 36, as will be understood from the figure.

Since clutching of the handle to the shaft is required only when the handle is pulled out of the clip, and declutching is desirable when the handle is stowed in the clip, it is convenient to effect these two relationships automatically by providing a forked finger 38 projecting from the section end wall to receive the pin 34 and cam it out so as to release the pinion 35. This camming action may be produced by beveling the inner end of the head of the pin, as shown in Figs. 26 and 27.

It will be understood that the mechanical advantage of the reduction gearing in the box 31 is such that when any one of the sections is manually propelled by turning either of its two handles 32 sufficient power can be applied to the section to cause it to push before it any number of other sections which have been swung to vertical position and arranged with their handles 32 declutched and stowed in their clips 36. Thus it is unnecessary to propel individually each of the sections that are to be moved. It is sufficient simply to unbolt such sections, allow them to swing to vertical position, and then drive only that one section which is farthest from the end or other part of the hatchway in which all the sections are to be stowed. For this reason the work and time required to open the hatchway are materially reduced.

Similarly, in closing the hatchway the sections may be propelled in groups by driving a single pusher section for as much of the distance that all the sections of the group must traverse. The sections are then individually cranked each to its proper location and then rotated to horizontal position.

Positioning accurately at proper location is important to make the adjacent sections fit well together. It is a simple matter to bring the sections into exact position so that the projecting edge 39 which is formed at one side of the top cover plate of each section will seat in the rabbet 40 which is formed in the other side of the next adjacent section, thus providing the overlapping fit best shown in Fig. 7. This accurate positioning of the sections is effected by providing chocks 41 pivoted to the tracks 6 so that they can be swung from an inoperative position out of the path of the rollers 12 (Fig. 8) into a position against the adjacent angle abutment 42 and across the track (Fig. 5) so as to block the rollers. It will be understood that when the hatchway is being closed the appropriate chock is swung out to stopping position as the section approaches, of the section is coming from the direction from which the chock has swung, i. e., from the righthand side in Fig. 5. If the section is approaching from the other direction, it is permitted slightly to overrun the chock while the chock is kept in withdrawn position. Then the chock is swung out and the section is backed up until the roller 12 is stopped by the chock. Lowering the section will then cause it to settle in exactly correct position relatively to the other sections.

To project the bolts 13 of each section automatically on settling of the section in horizontal, closing position I provide a release mechanism for raising the latch block 28 from behind the shoulder 19 (Fig. 14). This comprises a trigger 43 (Figs. 7 and 9) in the form of a lever of the first order fulcrumed in a bracket fixed on each end wall of the section. The upper end of the trigger is pin-connected to a push rod 44 extending back into the section and normally projected out from the section by the tension of a spring 45 (Fig. 13) pulling on a crank arm extending from a rockshaft 46 which runs across the section and projects into the bolt latching box 17 (Figs. 13 and 14). The lower end of the trigger is arranged to strike the track 6 just before the section settles in horizontal position and to be swung out and up by this contact with the track. This pushes the rod 44 inwardly, rotating rockshaft 46 counterclockwise as seen in Fig. 13. An arm 47 fast on the end of the rockshaft inside the box 17 is thereby swung up, lifting the latch block 28 from behind the shoulder 19 and permitting the spring 18 to expand to project the bolt 13, all as will be seen in Figs. 13 and 14. It results that it is necessary simply to push or slam the properly located sections down into closing position to have them automatically become bolted in such position, a position from which they cannot be moved to vertical position without again lifting one of the handles 27. Lifting of these handles withdraws the bolts in the manner hereinabove explained, and the latch block 28 is permitted to drop down into latching position behind the shoulder 19 just as soon as the trigger 43 is permitted to move a few degrees in a counterclockwise direction, which happens as soon as the section begins to swing about the noses 9 or rollers 12 and the trigger therefore leaves the track 6. Thus, latching of the bolts in retracted position is made contingent upon the section swinging toward open position; unless such swinging is begun there is no reason for the bolt to be held retracted and it is not kept retracted. Consequently, one is always assured that a lowered section is bolted closed.

To enable the handles 27 to be restored to the plane of the section cover plate while the section is in vertical position, so as to permit stowing raised sections in mutually engaging position as shown in the case of the three sections at the lefthand side of Fig. 2, each handle is coupled to the shaft 24 by the slip-clutch connection shown in Figs. 15 and 16. As there shown, the handle is provided with an integral collar in which the shaft 24 is journaled. Segmental lugs 48 and 49 fast on the handle collar and on the shaft respectively are arranged to stand in engagement when the shaft 24 is at the extreme of its clockwise turned position (Fig. 15) which is when the bolt 13 is projected, so that lifting of the handle from this position will turn the shaft counterclockwise as shown in Fig. 16. However, the segmental length of the lugs is short enough to permit the handle to be turned down from this elevated position without moving the shaft 24, the handle lug 48 simply turning clockwise toward the stationary shaft lug 49 to assume the position in which it is shown in Fig. 15 while the shaft lug remains in its Fig. 16 position. Thus the handle is lowered without changing the positions of the shaft 22 or the segment 21, stem 16, or bolt 13 as shown in Fig. 14.

While the structure thus far described constitutes a preferred embodiment of the main principles of the invention, not all of the elements and features need be used in combination or in the precise form disclosed in order to practice the invention, broadly considered. Various of the principles are separately useful, and the invention can thus be practiced in part by dispensing with certain of the structure if the advantages thereof are not desired, and numerous elements, mechanisms and assemblies may be modified in various ways. Furthermore, various additions of detail may be made to advantage.

Thus, for example, although the sections are easily swung and propelled by a single operator without undue effort, and although they are normally kept always within the confines of the hatchway, it may sometimes become desirable to lift them out of place for repair, replacement, or transfer from one ship to another. Moreover, there are times in the loading or unloading of a cargo vessel when practically every inch of hatch opening space is needed to clear some unusually large piece of cargo. For these reasons each of the cover sections is best provided with recesses in its cover plates at two or more points (preferably four), as shown at 50 in Fig. 28, and a stout pin 51 is secured in each recess so that a lifting cable, or the hooks of a sling, may be passed under the pins and the section elevated and handled by the ship's booms as is done with ordinary pontoon type hatch covers.

Again, the ends of the sections are offset, the bolt-containing halves which become lowered into the hatchway being shorter than the halves which become elevated. These cut-outs clearly appear at 52 in Fig. 5. It is desirable to close these openings when the sections are all in horizontal, closed position, and this can be done by mounting hinged closure plates 53 on the top of the coaming sides or bulb angle 5, as shown in Figs. 1 and 3, at spaced intervals along the coaming sides. These plates can be swung down to fill the openings 52, as shown in Fig. 3 and at the righthand side of Fig. 1, and they can be swung up and back sufficiently past vertical to rest stably in open position, as shown at the lefthand side of Fig. 1, when the sections are to be opened. As will be seen in the case of the third section from the right in Fig. 1, the closure plate can be made to expose, when lifted, the free end of handle 27 which is disposed in the open topped frame 8 (Fig. 6). In this way the handle is kept normally covered but is made conveniently accessible on lifting the corresponding closure plate, and of course it is this handle that must normally be operated to initiate the sequence of operations required to open a closed hatchway. Of course these closure plates 53 need not be hinged but may if desired be made bodily removable.

However, it is contemplated that in some cases the gear reduction ratio between the shafts 30 and 10 may be made small enough to permit a section to be moved along the coaming by a workman pushing directly against it, or by two workmen, one at each end of the section, without using either of the crank handles 32. This can often be done, as in installations in which the sections are not particularly large and heavy and/or when only a single section is to be moved without pushing any other section in advance of it. Such direct manual pushing movement is possible, with rotation of the shafts 10 and 30 but without rotation of the handles 32, if the handles are kept stowed, i. e., caught in their clips 36 with the housings 33 pushed in axially of the shaft 30 to the position shown in Fig. 26 in which, it will be noted, the pins 34 are withdrawn in unclutching position from the pinion 35.

In the same way the handles of opened sections that are to be propelled by a pushing section are kept stowed, so that they do not rotate.

Of course in large constructions, where the gear reduction ratio in box 31 is high, such movement of the sections is difficult or impractical because the gearing acts as a brake. This is advantageous because it prevents undesired movement of a section which might otherwise occur as for example when the hatchway sides are inclined or the ship is listing.

When closed, the closure plates 53 rest on the frames 8 and on the bolts 13 and are given firm support by these elements so that the entire rectangular surface of the section plus the closure plates provides excellent bearing for any cargo load that it may be desirable to position on the closed hatch.

In this connection it may be stated that no attempt is made to render the sections or their cover plates waterproof or to cause them to interfit in waterproof joints. Such tightness would, it is believed, be incompatible with the required ruggedness of the parts and the economical advantages of making them without the necessity of fine machining. It is much simpler and more effective to arrange a tarpaulin cover for the closed hatch, with the edge margins of the cover turned down along the coaming side walls in the usual manner and secured with the customary batten strips and wedges or dogs to make the hatch proof against entry of water.

It will be recalled that the enlargements 25 on the ends of shaft 24 have been described as formed with a radial slot for the reception of an emergency turning tool. This tool may be in the nature of a crowbar which can be applied to an enlargement for turning it and its shaft 24 to retract the bolts 13 whenever unbolting is required under some emergency condition in which the handles 27 cannot be operated. Thus, for example, in the highly improbable event that the bolts of one of the vertically positioned sections should somehow become projected against one of the longitudinal girders, with the handles 27 rendered inaccessible by another section stowed against them, as might happen in the case of the first and second sections at the extreme left in Fig. 2, the shafts 24 of these sections can be crowbar-turned to withdraw the bolts to latched position.

Figure 36:
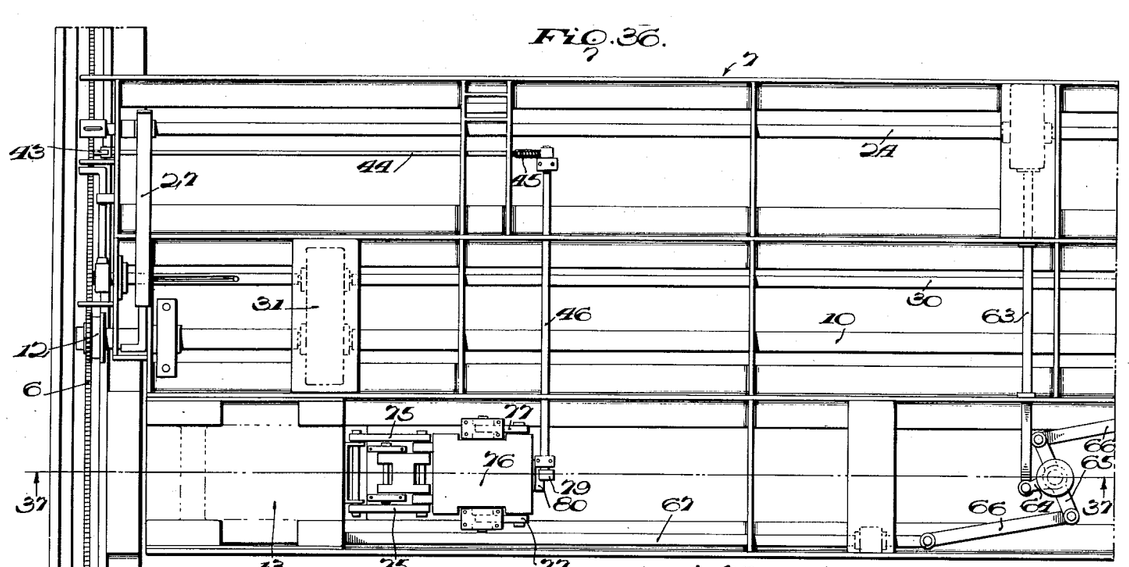
Fig. 36 is a partial top plan view like those of Figs. 10 and 29 but showing another modified form of hatch cover section.
Figure 38:
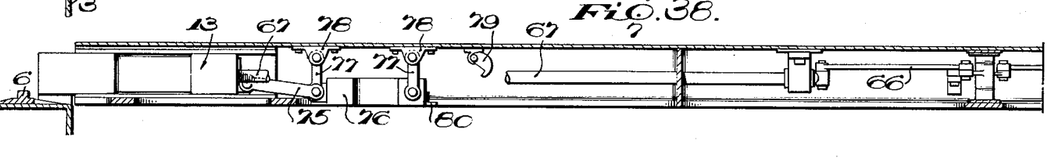
Fig. 38 is the same view showing, however, the bolt in projected position.
Figure 39:
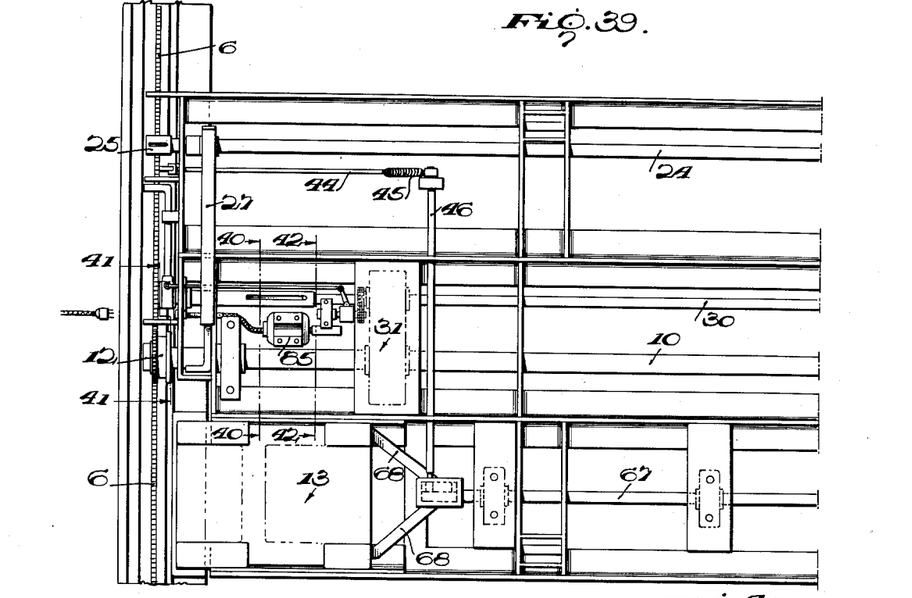
Fig. 39 is a partial top plan view like those of Figs. 10, 29 and 36 but showing a still further modified form of hatch cover section.
Figure 40:
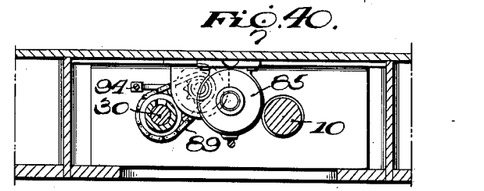
Figs. 40, 41 and 42 are respectively sections on the correspondingly numbered section lines of Fig. 39.
Figure 41:
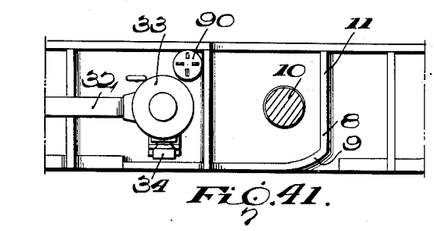
Figure 42:
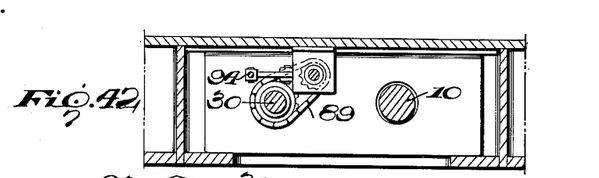

As has been stated hereinabove, the generic principles of the invention as pointed out by the broader of the appended claims are capable of being embodied in forms of construction modified from the arrangement depicted in Figs. 1–28 and heretofore described. Thus, Figs. 29–35 illustrate a modification of the bolt operating mechanism; Figs. 36–38 show a further modification of this mechanism in which the bolts are gravity-actuated to projected position; and Figs. 39–43 show a form of construction in which the sections are adapted to be power-propelled between stowed and covering positions. These selected modifications will now be briefly explained.

Figures 32, 33, 34, 35:
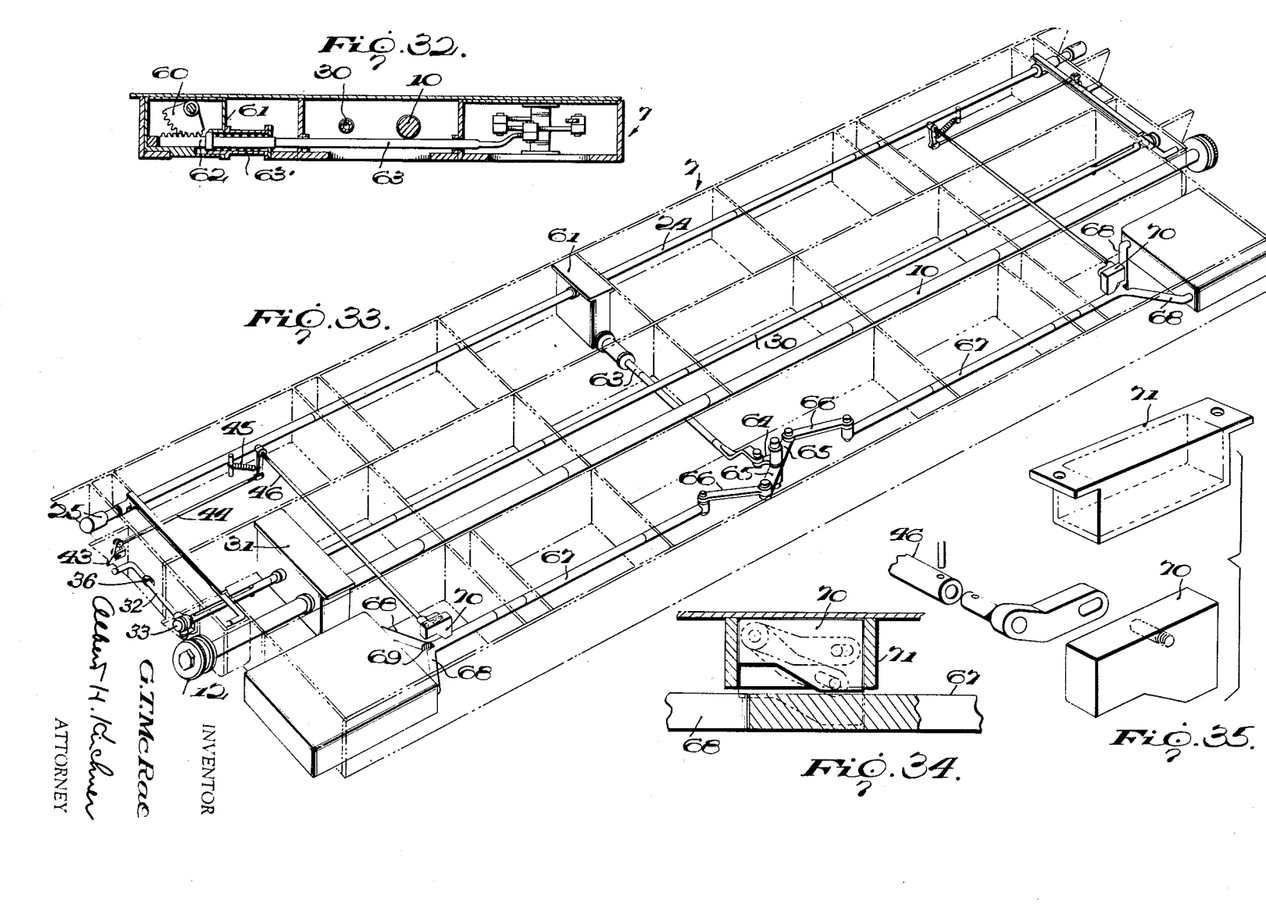
Fig. 33 is a perspective view like that of Fig. 13 but showing the same modification as in Figs. 29–32.
Fig. 34 is a detail section on the line 34—34 of Fig. 29.
Fig. 35 is an exploded perspective view of the parts shown in Fig. 34.

In Figs. 29–35 bolts 13, one at each section end, are housed in guideways like those heretofore described. However, this construction includes a different type of operating means actuated by handles 27. In this case each handle 27 rocks a lengthwise shaft 24 which carries, at about its longitudinal center, a gear segment 60 journaled in a housing 61, in which it is meshed with a rack 62 formed on the end of a transversely extending push-pull rod 63 which is normally biased to projected position by the compressive force of a coil spring 63' (Fig. 32). The other end of this rod is pivoted to an arm 64 of a double bellcrank 65 journaled in vertical bearings mounted in the framework of the section. Each of the arms of the double bellcrank 65 is pin-connected by a link 66 to a rod 67 extending lengthwise of the section so as to terminate in diverging branches 68 rigidly connected to one of the bolts 13. It will be evident that lifting either of the handles 27 will rock the shaft 24, push the rod 63, and rotate the bellcrank 65 to pull the two rods 67 inwardly, thus retracting each of the bolts.

To latch the bolts in retracted position, the junction of the branches 68 with each of the rods 67 is notched or cut out at 69 (Figs. 30 and 33) to provide a recess into which the nose of a latch block 70 will drop when the bolts are fully retracted. Entry of the block nose into the recess 69 is assured by the tension of a spring 45 related as heretofore explained to the rockshaft 46 projecting laterally from the block 70. The details of this block, including its mounting for sliding vertical movement in a housing 71, are best shown in Figs. 34 and 35.

The remainder of the construction of this form of section, including its general framework and its roller mounting, may be the same as that of the embodiment of the invention shown in Figs. 1–28.

Figure 37:
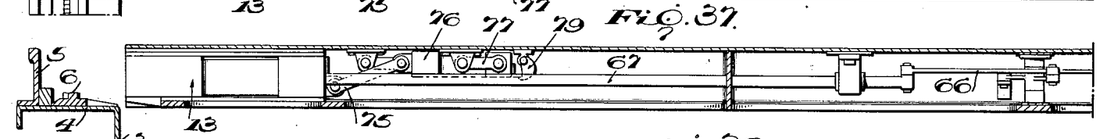
Fig. 37 is a longitudinal section on the line 37—37 of Fig. 36 showing the bolt in retracted position.

In the modification shown in Figs. 36–38, the bolt-operating mechanism is the same as has been described in connection with Figs. 29–35. However, in this construction the bolt-projecting means is gravity-actuated. Thus, each bolt 13 has pivoted to its inner end a pair of links 75 the inner ends of which are pin-connected to a weight 76 hung by links 77 for free swinging movement from link bearings 78 mounted in the section framework or on the top cover plate thereof. When the section is in horizontal, covering position gravity tends to keep the weight 76 down in its lowermost position, as shown in Fig. 38, with the links 77 hanging vertically and with the links 75 pushed outwardly to project the bolts. Rods 67, like those heretofore described, are connected directly to the inner ends of the bolts (branches like those shown at 68 in Figs. 29–35 need not be interposed) and pulling of these rods by lifting the handle 27 will retract the bolts and swing the weights 76 up around the centers of the bearings 78 to the elevated position shown in Fig. 37. They are latched in this position by a catch 79 which hooks under a flange 80 formed on the inner end of each weight, being urged into and held in engaging position by the spring 45 related to mechanism including the rockshaft 46 as heretofore explained.

Thus the bolts in this modification are automatically projected when the section moves to fully horizontal position and the trigger 43 contacts the coaming ledge 4 to push the rod 44 and rotate the rockshaft 46 to swing the catch 79 to weight-releasing position.

The other details of construction of the modification shown in Figs. 36–38, including the general framework structure, the supporting and propelling rollers, etc., may be the same as heretofore described.

Figure 43:
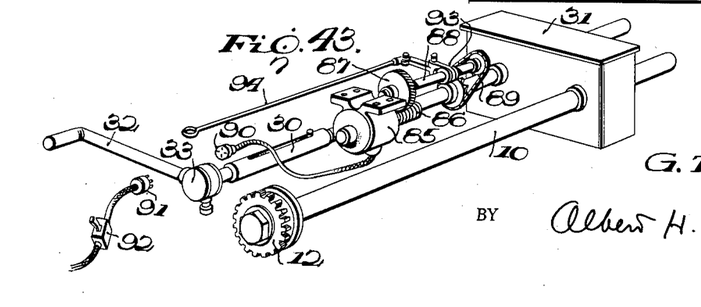
Fig. 43 is a perspective view of certain of the operating mechanism of the Fig. 39 embodiment of the invention.

In the embodiment shown in Figs. 39–43, power-operated means is provided for driving the rollers 12. This may include a small electric motor 85 bracketed inside the section near one end thereof and connected as best shown in Fig. 43, by reduction gearing which may include a worm 86, a worm wheel 87 on a jack shaft 88, and a sprocket chain and wheel assembly 89, to the shaft 30 which enters the gear box 31 heretofore described in which it is connected to the roller shaft 10. The motor 85 is supplied from a socket 90 mounted in the end wall of the section for reception of a plug 91 connected to some source of electric current available on the deck. It will be evident that when this source is plugged in and the circuit is closed, as by operating some switch like that shown at 92, the motor will be energized to turn the shaft 10 and its pair of terminal rollers 12 to propel the section.

To make this form of section capable of being propelled manually, whenever desired as in case of power unavailability or failure, the shaft 30 is provided with the handle 32, and the motor jack shaft 88 has interposed in it a clutch 93 operable by a rod 94 projecting through the end wall of the section. Thus the motor and the reduction gearing can be at any time unclutched so as to offer no resistance to manual operation.

While structures embodying the invention may be made in any dimensions, proportions and number of sections, a representative embodiment which has been produced and found to give complete satisfaction for use on the No. 2 weather deck hatch of a ship constructed by Waterman Steamship Corporation of Mobile, Alabama, comprised seven sections each having a maximum length of 21 feet 7 inches, a length of 19 feet 10 inches in its indented portion, and a width of 63¼ inches. The hatchway was 37½ feet long and 20 feet wide. The aggregate width of the seven sections was spread the full extent of the hatchway length by leaving narrow, uniform spacings in the joints formed by the edges 39 in the rabbets 40, as shown in Figs. 1 and 7, and moldings (not shown) were secured inside the end walls of the coaming. The unindented halves of the sections overlapped the longitudinal girders by about nine inches at each side, and the indented halves had a clearance of about one inch at each side when swinging down into or up out of the hatchway.

In addition to departures from these dimensions, proportions and number of sections, which are stated merely by way of exemplification and not limitation, it is to be understood that other changes may be made in the details of the illustrated embodiment and that not all the elements and features thereof need be employed in practicing the invention within the broad principles defined by the appended claims. In these claims the recitation of the singular is to be construed as including the plural, and the designation of the member 7 as a section is not necessarily to be regarded as implying that it functions to cover only a portion of the hatch.

Having thus described my invention, I claim:

1. In a hatch having a coaming surrounding a hatch opening, a cover section spanning the hatch and having a long side and a relatively short side connected by offset end edges providing a longer portion adapted to overlap the coaming and a shorter portion adapted to fit down into the hatch, a ledge outside the hatch opening at each of two opposite sides of the coaming, a track formed on each ledge, and a roller bearing on each track and provided on each end of the section mounting the section for rotation between a horizontal position covering the hatch and a vertical position in which the shorter portion projects down into the hatch, and means for driving said rollers to propel the section along the tracks.

2. In a hatch having a coaming surrounding a hatch opening, a cover section spanning the hatch and having a long side and a relatively short side connected by offset end edges providing a longer portion adapted to overlap the coaming and a shorter portion adapted to fit down into the hatch, a ledge outside the hatch opening at each of two opposite sides of the coaming, a rack formed on each ledge, a toothed roller meshed with each of the racks and provided on each end of the section mounting the section for rotation between a horizontal position covering the hatch and a vertical position in which the shorter portion projects down into the hatch, and means for driving the rollers for movement along the racks to carry the section along the coaming.

3. In a hatch having a coaming surrounding a hatch opening, a plurality of cover sections each spanning the hatch and having a long side and a relatively short side connected by offset end edges providing a longer portion adapted to overlap the coaming and a shorter portion adapted to fit down into the hatch, a ledge outside the hatch opening at each of two opposite sides of the coaming, a rack formed on each ledge, toothed rollers meshed with the racks and provided on each end of each section mounting the sections for rotation between vertical positions in which the shorter portions project down into the hatch and horizontal positions in which the sections are disposed in covering relation to the hatch with the side edges of adjacent sections mutually abutting, and means for driving the rollers of at least one of the sections to propel it, when in vertical position, along the coaming and to push before it each other section between it and the end of the coaming.

4. The structure claimed in claim 3, including chocks adjustably mounted on the coaming adjacent to the racks for stopping each of the sections in proper position to meet in abutting relation the adjacent section when said sections are disposed in horizontal position.

5. In a hatch having a coaming, a cover section spanning the hatch, means carried by the section and mounting it on the coaming for rotation between a horizontal position covering the hatch and a vertical position in which a portion of the section extends down into the hatch, a bolt slidably mounted in the named portion of the section for retraction to permit said rotation, means carried by the section latching the bolt in retracted position, means biasing the bolt to projected position, and means carried by the section automatically responsive to movement of the section to horizontal position to release the latch and the biasing means to project the bolt into overlapping relation with the coaming for securing the section in horizontal position.

6. The structure claimed in claim 5 in which the latch releasing means includes a trigger engageable with the coaming.

7. The structure claimed in claim 2 in which the means for driving the rollers includes a shaft mounting the rollers, a drive shaft geared thereto, and a handle connected to the drive shaft.

8. The structure claimed in claim 2 in which the means for driving the rollers includes a shaft mounting the rollers, a drive shaft geared thereto, a handle, and a clutch coupling the handle to the drive shaft whereby the section may be moved along the coaming with the handle unclutched from the drive shaft.

9. The structure claimed in claim 2 in which the means for driving the rollers includes a shaft mounting the rollers, a drive shaft geared thereto, a handle, a clutch coupling the handle to the drive shaft, a clip fixed on the section for holding the handle stationary, and means responsive to engaging the handle with the clip to unclutch the handle from the drive shaft whereby the section may be moved along the coaming without the handle turning.

10. The structure claimed in claim 2 in which the means for driving the rollers comprises an electric motor mounted in the section and connected to the rollers by reduction gearing.

11. The structure claimed in claim 2 in which the rollers are mounted fast on a common shaft and which includes an electric motor mounted in the section and connected to the shaft by reduction gearing.

12. The structure claimed in claim 2 in which the rollers are mounted fast on a common shaft and which includes an electric motor mounted in the section, and reduction gearing and clutch means coupling the motor to the shaft.

13. In a hatch having a coaming surrounding a hatch opening, a cover section spanning the hatch and having a long side and a relatively short side connected by offset end edges providing a longer portion adapted to overlap the coaming and a shorter portion adapted to fit down into the hatch, a track formed on each side of the coaming, and means formed on each end of the section for sequential bearing on the coaming and successive support of the section in turning movement between a horizontal position covering the hatch and a vertical position in which the shorter portion projects down into the hatch, said means comprising frames forming parts of the section and bearing on the coaming only when the section is in horizontal position and rollers rotatably mounted on the section and bearing on the tracks only when the section is in vertical position, each of the frames having a rounded nose which becomes spaced above the coaming as the section turns from horizontal toward vertical position, and the axis of each roller being so related to the center of curvature of the adjacent nose that the roller descends into bearing engagement with the track during said turning.

14. In a hatch having coaming ledges disposed along two opposite sides of a hatch opening, a cover member having a long side and a relatively short side connected by offset end edges providing a long portion overlapping the ledges and a shorter portion fitting between the ledges, integral portions of the member fixed against movement on the member at said end edges overlying said ledges and bearing thereon for supporting the member on said ledges when the member is disposed in horizontal position on the hatch opening, rollers overlying said ledges and projecting from said end edges on an axis between the center of gravity of the member and said long side and so positioned relatively to said integral portions that bearing engagement of said integral portions on said ledges will raise the peripheries of said rollers up out of bearing engagement with the ledges when the member is in horizontal position, and bolts projectible from the shorter portion into operative engagement with the ledges for holding the member in said horizontal position and retractible from said engagement to free the shorter portion to gravitate into the hatch opening and bring the rollers down into bearing engagement with the ledges and cause the integral bearing portions to rise out of bearing engagement with the ledges.

15. The combination claimed in claim 14, including tracks having teeth formed on the coaming ledges, teeth formed on the rollers and meshed with said track teeth, and means for driving the rollers to move the member along the tracks.

16. In a hatch having a coaming, a rotatable cover section spanning the hatch and having a longer portion extending over the coaming provided with an under surface adapted to bear thereon for mounting the section normally in horizontal position covering the hatch and having an adjacent shorter portion short enough to fit down into the hatch on rotation of the section through approximately 90° from said horizontal position, a bolt slidably mounted in the shorter portion for retraction into the section and for projection beyond the end of said portion into overlapping relation with the coaming for securing the section against rotation from horizontal position, a bearing element projecting from one of said portions above the level of said under surface of the longer portion adapted to be lowered into bearing engagement with the coaming automatically in response to rotation of the section from horizontal position and to bear the full weight of the section when rotated from horizontal position, spring means biasing the bolt to projected position, releasable latch means for holding the spring means compressed and the bolt retracted, and means automatically operative on movement of the section to horizontal position to release the latch means and thereby project the bolt.

17. In a hatch having a coaming, a cover section for the hatch, means for mounting the section on the coaming for rotation between horizontal position covering at least a portion of the hatch and vertical uncovering position, said means comprising a pair of supporting elements projecting from each side of the section into overlapping relation with the coaming including a first bearing element adapted to engage the coaming when the section is in vertical position and thereby support the entire weight of the section and including also a second bearing element adapted to swing down into engagement with the coaming when the section is in horizontal position and thereby support substantially the entire weight of the section and hold the first bearing element elevated out of supporting position, and a bolt projectile from the section into overlapping relation with the coaming when the section is in horizontal position for preventing rotation of the section.

18. The combination claimed in claim 17, in which each of the first bearing elements is a roller for supporting the section movably along the coaming.

19. The combination claimed in claim 17, in which each side of the coaming is provided with a longitudinally extending rack and in which each of the first bearing elements is a roller having peripheral teeth engageable with the rack for supporting the section movably along the coaming on rotation of the rollers with the section in vertical position.

20. The combination claimed in claim 17, including means operative automatically responsive to the section swinging to horizontal position to project the bolt.

21. The combination claimed in claim 17, including means carried by the section, overlapping the coaming and adapted to strike the coaming and project the bolt when the section swings to horizontal position.

22. In a hatch having a coaming, a cover section spanning the hatch and having a long side and a relatively short side connected by offset end edges providing a longer portion adapted to overlap the coaming and a shorter portion adapted to fit down into the hatch, means carried by the section and supporting it on the coaming for rotation from a vertical position in which the shorter portion projects down into the hatch to a horizontal position in which the longer portion bears on the coaming and relieves the weight of the section on said supporting means, a pair of bolts slidably mounted in the shorter portion, said bolts being coupled together for simultaneous movement in projection and for simultaneous movement in retraction from the opposite ends of said portion into overlapping relation with the coaming for securing the section in horizontal position, and means automatically responsive to movement of the section to horizontal position to project the bolts.

23. In a hatch having a coaming, a cover section spanning the hatch, means mounting the section on the coaming for rotation between a horizontal position covering the hatch and a vertical position in which a portion of the section extends down into the hatch, a bolt slidably mounted in the named portion of the section for retraction into the section to permit said rotation and for projection beyond the end of the section into overlapping relation with the coaming for securing the section in horizontal position, means for projecting the bolt including a gravity actuated weight, means linking the weight to the bolt, means suspending the weight in the section for swinging movement between raised position holding the bolt retracted and lowered position projecting the bolt, means for moving the weight to raised position, a latch for holding the weight in raised position, and means for releasing the latch.

24. The structure claimed in claim 23, including means automatically responsive to movement of the section to horizontal position to release the latch.

25. In a hatch having coaming ledges disposed along two opposite sides of a hatch opening, a cover member having a long side and a relatively short side connected by offset end edges providing a long portion overlapping the ledges and a shorter portion fitting between the ledges, integral portions of the member at said end edges overlying said ledges and bearing thereon for supporting the member on said ledges when the member is disposed in horizontal position on the hatch opening, rollers overlying said ledges and projecting from said end edges and so positioned relatively to said integral portions that bearing engagement of said integral portions on said ledges will raise the peripheries of said rollers up out of bearing engagement with the ledges when the member is in horizontal position, and bolts projectible from the shorter portion into operative engagement with the ledges for holding the member in said horizontal position and retractible from said engagement to free the shorter portion for swinging movement down into the hatch opening and bring the rollers down into bearing engagement with the ledges and cause the integral bearing portions to rise out of bearing engagement with the ledges, in combination with tracks formed on the ledges having parallel side by side smooth portions and rack portions, toothed portions and smooth portions formed on the rollers and surmounting respectively the rack and smooth portions of the tracks with the smooth portions of the rollers bearing on the smooth portions of the tracks when the member is in vertical position, and means for driving the rollers to move the member along the tracks.

26. In a hatch having coaming ledges disposed along two opposite sides of a hatch opening, a cover member having a long side and a relatively short side connected by offset end edges providing a long portion overlapping the ledges and a shorter portion fitting between the ledges, integral portions of the member at said end edges overlying said ledges and bearing thereon for supporting the member on said ledges when the member is disposed in horizontal position on the hatch opening, rollers overlying said ledges and projecting from said end edges and so positioned relatively to said integral portions that bearing engagement of said integral portions on said ledges will raise the peripheries of said rollers up out of bearing engagement with the ledges when the member is in horizontal position, and bolts projectible from the shorter portion into operative engagement with the ledges for holding the member in said horizontal position and retractible from said engagement to free the shorter portion for swinging movement down into the hatch opening and bring the rollers down into bearing engagement with the ledges and cause the integral bearing portions to rise out of bearing engagement with the ledges, in combination with means carried by the member and automatically responsive to movement of the member to horizontal position for projecting the bolts into engagement with the coaming for securing the member in horizontal position.

27. In a hatch having a coaming, a cover section spanning the hatch, means mounting the section on the coaming for rotation between a horizontal position covering the hatch and a vertical position in which a portion of the section extends down into the hatch, a bolt slidably mounted in the named portion of the section for retraction into the section to permit said rotation and for projection beyond the end of the section into overlapping relation with the coaming for securing the section in horizontal position, means for projecting the bolt including a gravity actuated weight, means linking the weight to the bolt, a releasable latch for holding the weight elevated and the bolt retracted, and means for releasing the latch whereby the weight may fall and operate said linking means to project the bolt.

References Cited in the file of this patent

UNITED STATES PATENTS

| 1,674,760 | Carroll | June 26, 1928 |
| 1,735,329 | MacGregor | Nov. 12, 1929 |
| 2,511,007 | Prehn | June 13, 1950 |

FOREIGN PATENTS

| 6,547 | Great Britain | of 1915 |
| 25,799 | Great Britain | of 1910 |